United States Patent
Shiroyama et al.

(10) Patent No.: US 8,744,673 B2
(45) Date of Patent: Jun. 3, 2014

(54) VEHICLE AIR CONDITIONER AND CONTROL METHOD AND PROGRAM FOR VEHICLE AIR CONDITIONER

(75) Inventors: Katsunari Shiroyama, Aichi (JP); Hideaki Tatenoi, Aichi (JP); Tomoki Izawa, Aichi (JP); Yasushi Ohta, Shizuoka (JP); Shigeki Ishikawa, Shizuoka (JP)

(73) Assignees: Mitsubishi Heavy Industries, Ltd., Tokyo (JP); Suzuki Motor Corporation, Hamamatsu-shi (JP)

( * ) Notice: Subject to any disclaimer, the term of this patent is extended or adjusted under 35 U.S.C. 154(b) by 93 days.

(21) Appl. No.: 13/056,221
(22) PCT Filed: Oct. 9, 2009
(86) PCT No.: PCT/JP2009/067637
§ 371 (c)(1),
(2), (4) Date: Jan. 27, 2011
(87) PCT Pub. No.: WO2010/041738
PCT Pub. Date: Apr. 15, 2010

(65) Prior Publication Data
US 2011/0160958 A1 Jun. 30, 2011

(30) Foreign Application Priority Data
Oct. 10, 2008 (JP) ................. 2008-264338

(51) Int. Cl.
*B60H 1/00* (2006.01)
*G05D 23/27* (2006.01)
*G06F 7/00* (2006.01)

(52) U.S. Cl.
CPC ........ *B60H 1/00642* (2013.01); *B60H 1/00735* (2013.01); *B60H 1/0075* (2013.01); *G06F 7/00* (2013.01); *G05D 23/27* (2013.01)
USPC .............................. 701/36; 236/91 E; 62/244

(58) Field of Classification Search
USPC .................. 701/36; 62/179, 244; 165/203; 236/49.3, 91 E; 454/75
See application file for complete search history.

(56) References Cited

U.S. PATENT DOCUMENTS 4,890,460 A    1/1990  Takasi et al.
(Continued)

FOREIGN PATENT DOCUMENTS

JP    1-136811 A    5/1989
(Continued)

OTHER PUBLICATIONS

Extended European Search Report dated Jul. 12, 2012, issued in corresponding European Patent Application No. 09819271.9.
(Continued)

*Primary Examiner* — Helal A Algahaim
*Assistant Examiner* — Dale W Hilgendorf
(74) *Attorney, Agent, or Firm* — Westerman, Hattori, Daniels & Adrian, LLP

(57) ABSTRACT

In a vehicle air conditioner for a vehicle cabin interior is split into a plurality of air-conditioned zones, that is capable of independent air conditioning control for individual air-conditioned zones, provided is a solar radiation sensor that measures solar radiation levels individually for a first air-conditioned zone and a second air-conditioned zone adjacent thereto; a judging unit (100) that judges whether or not a difference between the solar radiation level of the first air-conditioned zone and the solar radiation level of the second air-conditioned zone falls within a predetermined range; a first controller (101) that performs identical air conditioning control for the first air-conditioned zone and the second air-conditioned zone when the difference falls within the predetermined range; and a second controller (102) that performs independent air conditioning control individually for the first air-conditioned zone and the second air-conditioned zone when the difference falls outside the predetermined range.

6 Claims, 4 Drawing Sheets

(56) References Cited

U.S. PATENT DOCUMENTS

| | | | |
|---|---|---|---|
| 5,020,424 A | | 6/1991 | Iida et al. |
| 5,056,421 A | | 10/1991 | Iida |
| 5,186,682 A | * | 2/1993 | Iida .................................. 454/75 |
| 5,337,802 A | * | 8/1994 | Kajino et al. ................. 165/203 |
| 5,704,544 A | | 1/1998 | Samukawa et al. |
| 5,725,052 A | * | 3/1998 | Kawai et al. .................. 165/203 |
| 6,012,297 A | * | 1/2000 | Ichishi et al. ................... 62/179 |
| 6,390,380 B2 | * | 5/2002 | Ichishi et al. ................ 236/49.3 |
| 6,575,378 B2 | * | 6/2003 | Aoki et al. ................... 236/49.3 |

FOREIGN PATENT DOCUMENTS

| | | | |
|---|---|---|---|
| JP | 2-258407 A | | 10/1990 |
| JP | 3-65427 A | | 3/1991 |
| JP | 4-173415 A | | 6/1992 |
| JP | 4-218423 A | | 8/1992 |
| JP | 5-32124 A | | 2/1993 |
| JP | 10-278540 A | | 10/1998 |
| JP | 2002-144840 A | | 5/2002 |
| JP | 2005-329929 A | | 12/2005 |
| JP | 2006-264485 A | | 10/2006 |

OTHER PUBLICATIONS

International Search Report of PCT/JP2009/067637, mailing date Nov. 2, 2009.

Japanese Office Action dated Nov. 13, 2012, issued in corresponding Japanese Patent Application No. 2008-264338, with Partial translation (9 pages).

Decision to Grant a Patent issued on Jul. 23, 2013 in Japanese Patent Application No. 2008-264338. (The Decision to Grant a Patent has been received).

Japanese Office Action dated Oct. 22, 2013, issued in corresponding Japanese Patent Application No. 2013-004629 with English translation (7 pages).

Extended European Search Report dated Sep. 18, 2013, issued in corresponding European Patent Application No. 13180066.6 (8 pages).

English translation of the Decision to Grant a Patent dated Feb. 25, 2014, issued in Japanese Patent Application No. 2013-004629 (3 pages).

Japanese Decision to Grant a Patent dated Feb. 25, 2014, issued in corresponding Japanese Application No. 2013-004629 (3 pages).

Explanation of Relevancy: the Decision to Grant a Patent has been received.

* cited by examiner

VEHICLE AIR CONDITIONER AND CONTROL METHOD AND PROGRAM FOR VEHICLE AIR CONDITIONER

TECHNICAL FIELD

The present invention relates to a vehicle air conditioner and to a control method and program for a vehicle air conditioner.

BACKGROUND ART

Conventionally, in a vehicle such as a passenger vehicle or the like, a vehicle air conditioner has been realized that is capable of independently controlling the temperature of air-conditioned zones, which split a vehicle cabin interior into right and left sides, for example, a driver-seat side and a passenger-seat side, according to preferences of the occupants. As a system for independently controlling air conditioning of the air-conditioned zones split into right and left sides, Heating Ventilating and Air-Conditioning Systems (herein after abbreviated as HVAC) have been known, among which is a vehicle air conditioner that employs an uneven-solar-radiation sensor to independently perform air conditioning for the right and left zones in accordance with uneven solar radiation. Here, the blowout temperature and air flow level for the right and left zones are controlled depending on the solar radiation, etc. of the right and left zones. For example, Japanese Unexamined Patent Application, Publication No. Hei 01-136811 discloses a technique in which values detected from the right and left air-conditioned zones are compared with a calculated value based on a predetermined calculation, and the larger value of the above-described compared values is used as a correction value to control air conditioning equipment in a vehicle.

CITATION LIST

Patent Literature

{PTL1} Japanese Unexamined Patent Application, Publication No. Hei 01-136811.

SUMMARY OF INVENTION

Technical Problem

However, in the invention of the above-described Patent Literature 1, many computations are necessary to obtain the correction value of the air conditioning temperature for the right and left air-conditioned zones, and there is a problem in that processing thereof is complicated.

In addition, because the size of the sun is large and its distance from the vehicle is large, the perceived temperature for the occupants does not change even if the direction of the solar radiation is slightly shifted from the center. In spite of this, the invention disclosed in Patent Literature 1 finely controls the air conditioning system even when the direction of the solar radiation shifts slightly from the center, and there is a problem in that the blowout temperature ends up being changed frequently.

The present invention has been conceived to solve the above-described problems, and an object thereof is to provide a vehicle air conditioner that makes it possible to perform air conditioning control matching the perception of vehicle occupants with simple processing, as well as a control method and program for the vehicle air conditioner.

Solution to Problem

In order to solve the above-described problems, the present invention employs the following solutions.

A first aspect of the present invention provides a vehicle air conditioner for a vehicle cabin interior split into a plurality of air-conditioned zones, that is capable of independent air conditioning control for individual air-conditioned zones, including a solar radiation sensor that measures solar radiation levels individually for a first air-conditioned zone and a second air-conditioned zone, which are adjacent to each other; a judging unit that judges whether or not a difference between the solar radiation level of the first air-conditioned zone and the solar radiation level of the second air-conditioned zone falls within a predetermined range; a first controller that performs identical air conditioning control for the first air-conditioned zone and the second air-conditioned zone when the difference falls within the predetermined range; and a second controller that performs independent air conditioning control individually for the first air-conditioned zone and the second air-conditioned zone when the difference falls outside the predetermined range.

With such a configuration, of the plurality of air-conditioned zones splitting the vehicle cabin interior, the solar radiation sensor individually measures the solar radiation levels of the first air-conditioned zone and the second air-conditioned zone, which are adjacent to each other, and the judging unit judges whether or not the difference between the solar radiation level of the first air-conditioned zone and the solar radiation level of the second air-conditioned zone measured by the solar radiation sensor falls within the predetermined range. When this difference falls within the predetermined range, identical air conditioning control is performed for the first air-conditioned zone and the second air-conditioned zone, which are adjacent to each other, and when the difference falls outside the predetermined range, independent air conditioning control is performed individually for the first air-conditioned zone and the second air-conditioned zone.

Accordingly, when the perception of the solar radiation is nearly equivalent in the first air-conditioned zone and the second air-conditioned zone, it is possible not to cause a temperature difference in air conditioning, and, in addition, when the perception of the solar radiation differs between the first air-conditioned zone and the second air-conditioned zone, it is possible to perform air conditioning control appropriate for the state of air conditioning in each air-conditioned zone.

In the above-described vehicle air conditioner, of the first air-conditioned zone and the second air-conditioned zone, the first controller may select the air-conditioned zone with a higher solar radiation level as a first reference zone and may perform the air conditioning control of the first air-conditioned zone and the second air-conditioned zone on the basis of the solar radiation level of the first reference zone.

In this way, because air conditioning control for the individual air-conditioned zones is performed using the solar radiation level for the air-conditioned zone with the higher solar radiation level as a reference, temperature can be easily corrected for the individual air-conditioned zones.

In the above-described vehicle air conditioner, of the first air-conditioned zone and the second air-conditioned zone, the second controller may select one zone as a second reference zone and may perform the air conditioning control for the other air-conditioned zone on the basis of the solar radiation level of the second reference zone.

In this way, because one of the first air-conditioned zone and the second air-conditioned zone is selected as the second reference zone, and air conditioning control for the other air-conditioned zone is performed on the basis of the solar radiation level of the second reference zone, the temperature can be easily corrected.

In the above-described vehicle air conditioner, the second controller may select the air-conditioned zone with a higher solar radiation level as the second reference zone.

Accordingly, control can be performed on the basis of the solar radiation level of the air-conditioned zone for which the solar radiation level is high and is assumed to feel uncomfortable.

A second aspect of the present invention provides a vehicle air conditioner for a vehicle cabin interior split into a plurality of air-conditioned zones, that is capable of independent air conditioning control for individual air-conditioned zones, including a solar radiation sensor that is provided near a boundary between a first air-conditioned zone and a second air-conditioned zone, which are adjacent to each other, and that measures an incident angle of sunlight; a judging unit that judges whether or not the incident angle of the sunlight detected by the solar radiation sensor falls within a predetermined range; a first controller that performs identical air conditioning control for the first air-conditioned zone and the second air-conditioned zone when the incident angle of the sunlight falls within the predetermined range; and a second controller that performs independent air conditioning control individually for the first air-conditioned zone and the second air-conditioned zone when the incident angle of the sunlight falls outside the predetermined range.

With such a configuration, the solar radiation sensor measures the incident angle of the sunlight near the boundary between the first air-conditioned zone and the second air-conditioned zone, which are adjacent to each other, and the judging unit judges whether or not this incident angle falls within the predetermined range. When the incident angle of the sunlight falls within the predetermined range, identical air conditioning control is performed for the first air-conditioned zone and the second air-conditioned zone, which are adjacent to each other, and when the incident angle of the sunlight falls outside the predetermined range, independent air conditioning control is performed individually for the first air-conditioned zone and the second air-conditioned zone. Accordingly, when substantially equal levels of sunshine are entering the first air-conditioned zone and the second air-conditioned zone and it is assumed that perceived temperatures therein are substantially equivalent, frequent changes in air conditioning can be prevented by applying shared air conditioning control to both air-conditioned zones, and when it cannot be assumed that the perceived temperature is substantially equivalent, it is possible to perform air conditioning control appropriate for the state of air conditioning in each air-conditioned zone. The above-described predetermined range is, for example, angles of −45° to +45°.

A third aspect of the present invention provides a control method for a vehicle air conditioner for a vehicle cabin interior split into a plurality of air-conditioned zones, that is capable of independent air conditioning control for individual air-conditioned zones, including a step of measuring solar radiation levels individually for a first air-conditioned zone and a second air-conditioned zone, which are adjacent to each other, and judging whether or not a difference between the solar radiation level of the first air-conditioned zone and the solar radiation level of the second air-conditioned zone falls within a predetermined range; a first controlling step of performing identical air conditioning control for the first air-conditioned zone and the second air-conditioned zone when the difference falls within the predetermined range; and a second controlling step of performing independent air conditioning control individually for the first air-conditioned zone and the second air-conditioned zone when the difference falls outside the predetermined range.

A fourth aspect of the present invention provides a vehicle air conditioner program that is a control program applied to a vehicle air conditioner for a vehicle cabin interior split into a plurality of air-conditioned zones, which is capable of independent air conditioning control for individual air-conditioned zones, and that causes a computer to execute judgment processing in which solar radiation levels are individually measured for a first air-conditioned zone and a second air-conditioned zone, which are adjacent to each other, and it is judged whether or not a difference between the solar radiation level of the first air-conditioned zone and the solar radiation level of the second air-conditioned zone falls within a predetermined range; first control processing of performing identical air conditioning control for the first air-conditioned zone and the second air-conditioned zone when the difference falls within the predetermined range; and second control processing of performing independent air conditioning control individually for the first air-conditioned zone and the second air-conditioned zone when the difference falls outside the predetermined range.

A fifth aspect of the present invention provides a control method for a vehicle air conditioner for a vehicle cabin interior split into a plurality of air-conditioned zones, that is capable of independent air conditioning control for individual air-conditioned zones, including a step of measuring an incident angle of sunlight by a solar radiation sensor, provided near a boundary between a first air-conditioned zone and a second air-conditioned zone, which is adjacent to each other, and judging whether or not the incident angle of the sunlight detected by the solar radiation sensor falls within a predetermined range; a first controlling step of performing identical air conditioning control for the first air-conditioned zone and the second air-conditioned zone when the incident angle of the sunlight falls within the predetermined range; and a second controlling step of performing independent air conditioning control individually for the first air-conditioned zone and the second air-conditioned zone when the incident angle of the sunlight falls outside the predetermined range.

A sixth aspect of the present invention provides a vehicle air conditioner program that is a control program applied to a vehicle air conditioner for a vehicle cabin interior split into a plurality of air-conditioned zones, which is capable of independent air conditioning control for individual air-conditioned zones, and that causes a computer to execute judgment processing of measuring an incident angle of sunlight by a solar radiation sensor, provided near a boundary between a first air-conditioned zone and a second air-conditioned zone, which are adjacent to each other, and judging whether or not the incident angle of the sunlight detected by the solar radiation sensor falls within a predetermined range; first control processing of performing identical air conditioning control for the first air-conditioned zone and the second air-conditioned zone when the incident angle of the sunlight falls within the predetermined range; and second control processing of performing independent air conditioning control individually for the first air-conditioned zone and the second air-conditioned zone when the incident angle of the sunlight falls outside the predetermined range.

Advantageous Effects of Invention

The present invention affords an advantage in that air conditioning control matching the perception of vehicle occupants can be performed with simple processing.

DESCRIPTION OF EMBODIMENTS

An embodiment of a vehicle air conditioner and a control method and program for the vehicle air conditioner according to the present invention will be described below, with reference to the drawings. The following embodiment will be described assuming a cooling mode.

First Embodiment

Figure 1:
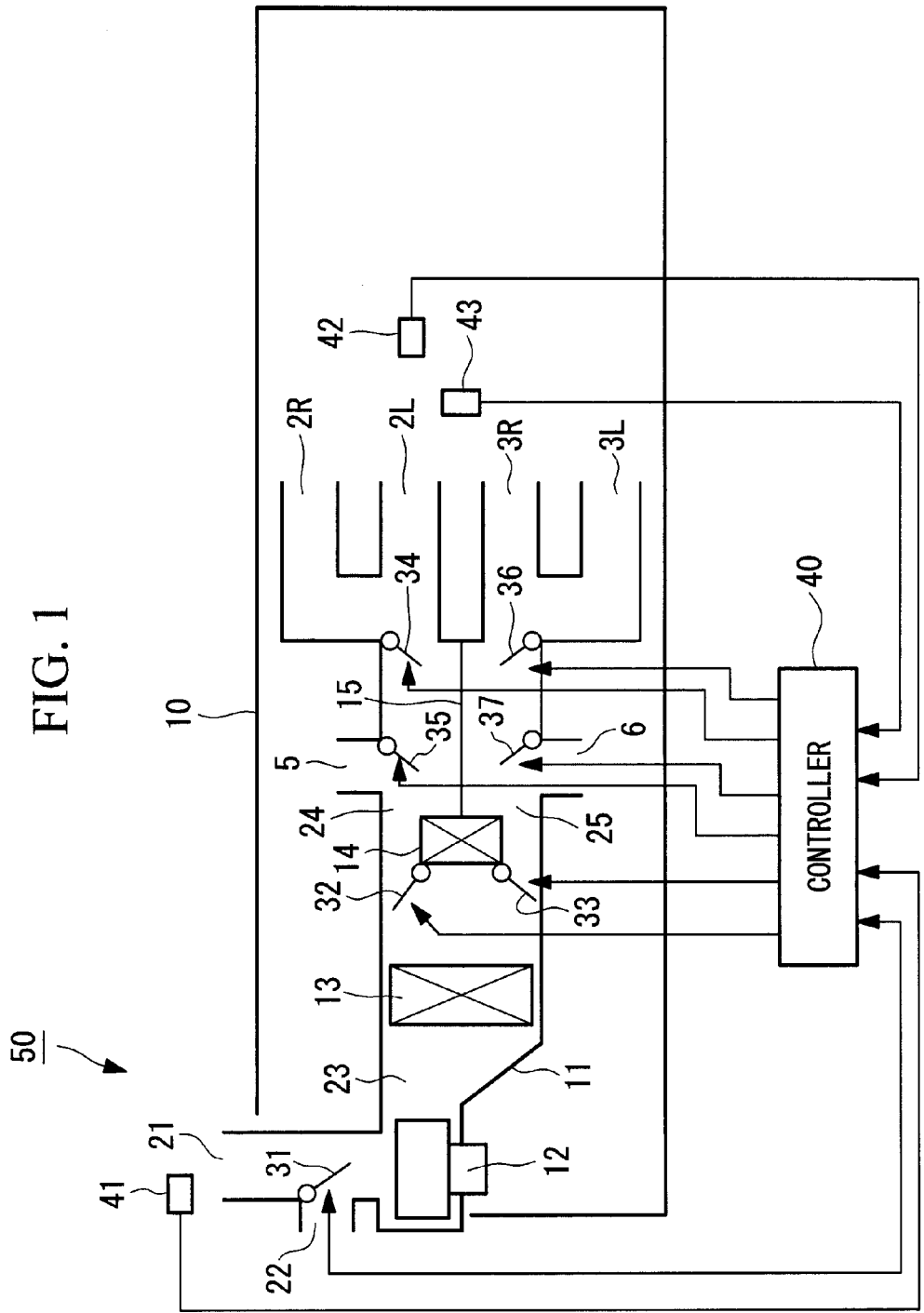
FIG. 1 is a circuit block diagram showing the schematic configuration of a vehicle air conditioner according to a first embodiment of the present invention.

FIG. 1 is a diagram showing the schematic configuration of a vehicle air conditioner according to this embodiment.

The vehicle air conditioner (hereinafter referred to as "air conditioner") 50 is configured mainly having an HVAC 10, which is an air conditioning unit that performs air conditioning such as cooling, heating, etc., a refrigerant system (not shown) that supplies the air conditioning unit with refrigerant, a heating source system (not shown), which supplies the air conditioning unit with engine-cooling water that serves as a heat source, and a controller 40 that performs control for the operation of the apparatus as a whole.

Figure 2:
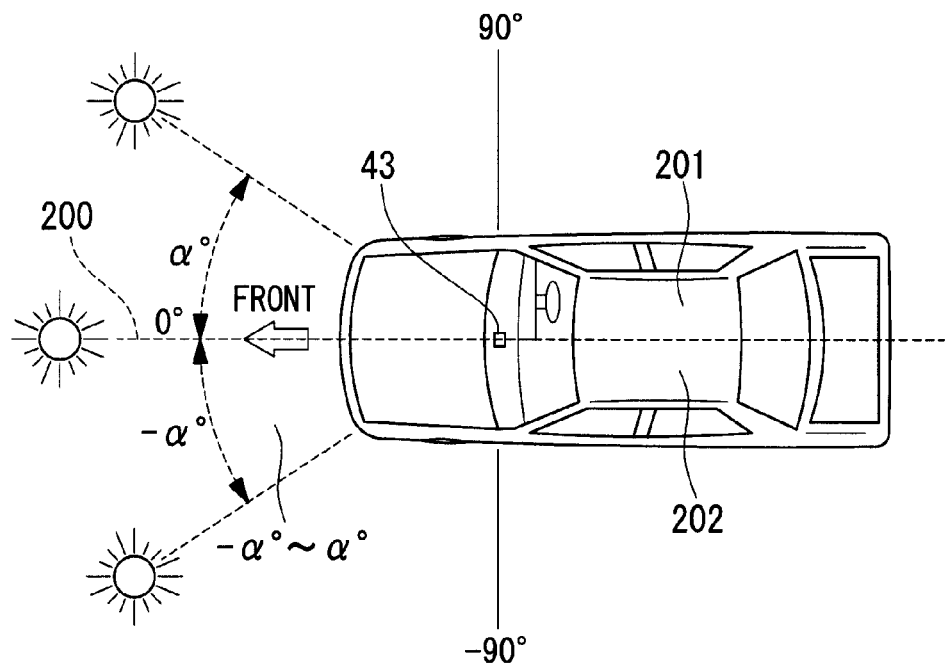
FIG. 2 is a diagram for explaining vehicle air-conditioned zones according to the first embodiment of the present invention.

The cabin interior of a vehicle in which such an air conditioner is installed is split into a plurality of air-conditioned zones, wherein independent air conditioning control is possible for individual air-conditioned zones. As shown in FIG. 2, this embodiment assumes a case in which the cabin interior is divided into two along an axial line 200 parallel to the running direction of the vehicle, thereby splitting the cabin interior into a first air-conditioned zone 201 on the driver-seat side and a second air-conditioned zone 202 on the passenger-seat side.

The HVAC 10 is configured having various devices such as a blower 12, an evaporator 13, a heater core 14, etc. in a main body casing 11.

The main body casing 11 is provided with an external-air introducing port 21 and an internal-air introducing port 22 that are air-intake ports for selectively introducing the air outside the vehicle cabin (external air) and the air inside the vehicle cabin (internal air), and is provided with a defrosting vent (not shown), face vents 2L and 2R and a foot vent 5 for the driver-seat side, and face vents 3L and 3R and a foot vent 6 for the passenger-seat side, as air vents for blowing out air conditioned cool air, warm air, etc. into the vehicle cabin in accordance with the operating mode. In the following description, the air outside the vehicle cabin (external air) and the air inside the vehicle cabin (internal air) introduced from the air intake ports will be referred to as "introduced air" as a whole.

The HVAC 10 is provided with air-mixing dampers 32 and 33 for each air-conditioned zone. In addition, because a first air-conditioned zone flow path 24 and a second air-conditioned zone flow path 25, which are separated by a partition plate 15, each have a vent to which a damper is attached, the controller 40 can perform different air conditioning control independently for each of the air-conditioned zones.

A flow path 23, through which the introduced air of the external air or the internal air flows by operation of an internal/external air switching damper 31 to perform air conditioning, is formed inside the main body casing 11. This flow path 23 has the blower 12 downstream of the external air introducing port 21 and the internal air introducing port 22, and, furthermore, the evaporator 13 and the heater core 14 are sequentially disposed therein from an upstream side in the flow direction, with a predetermined gap therebetween.

At the downstream side of the heater core 14, the flow path 23 is divided by the partition plate 15 into a driver-seat side flow path 24 and a passenger-seat side flow path 25.

In addition, the heater core 14 is provided with the air-mixing dampers 32 and 33 that perform distribution and flow-path switching of the introduced air that has flowed through the flow path 23. That is, the air-mixing dampers 32 and 33, in accordance with the operated positions and degrees of opening thereof, have a function of adjusting the flow of the introduced air, such as distributing between the volume of the introduced air that flows through the heater core 14 and the volume of the introduced air that bypasses the heater core 14, performing flow-path switching between a state in which the whole volume of the introduced air flows through the heater core 14 and a state in which the whole volume of the introduced air bypasses the heater core 14. Therefore, a mixing ratio between cooled air that has passed through the evaporator 13 and warmed air that has passed through the heater core 14 is changed by controlling the degree of opening of the air-mixing dampers 32 and 33, thereby making it possible to adjust the blowout temperature of the air conditioned air that blows out into the vehicle cabin from the air vents.

The driver-seat side flow path 24 is provided with the face vents 2L and 2R, the foot vent 5, and the defrost vent, to each of which a damper is attached. The dampers attached to the face vents 2L and 2R are referred to as driver-seat face dampers 34, and the damper attached to the foot vent 5 is referred to as a driver-seat foot damper 35.

Similarly, the passenger-seat side flow path 25 is provided with the face vents 3L and 3R, the foot vent 6, and the defrost vent, described above, to each of which a damper is attached. The dampers attached to the face vents 3L and 3R are referred to as passenger-seat face dampers 36, and the damper attached to the foot vent 6 is referred to as a passenger-seat foot damper 37.

In addition, the air conditioner 50 is provided with an outdoor-air temperature sensor 41 that detects the temperature outside the vehicle cabin, a cabin-temperature sensor 42 that detects the temperature inside the vehicle cabin, and a solar radiation sensor 43 that detects the solar radiation level.

Figure 3:
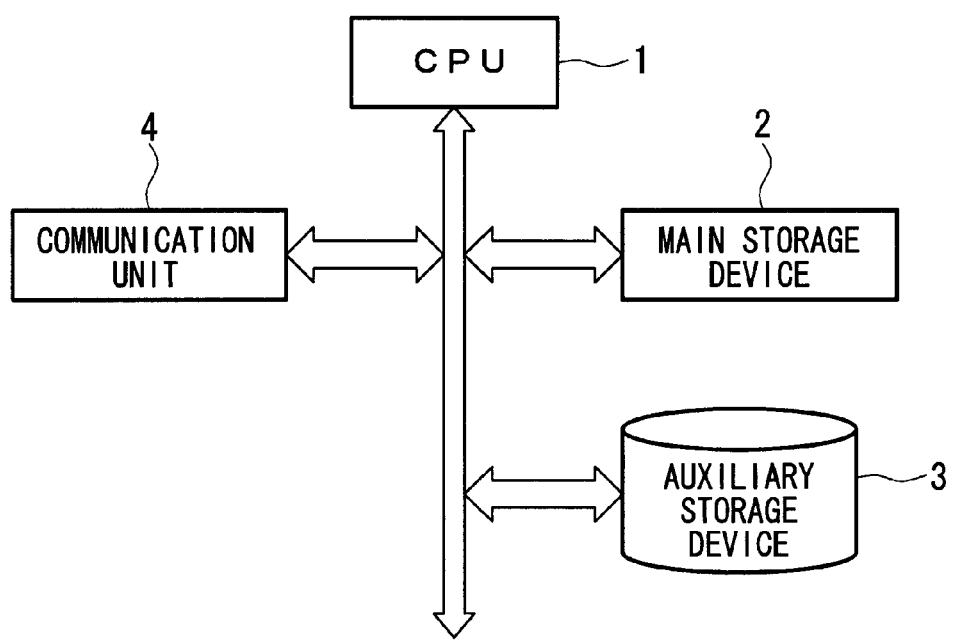
FIG. 3 is a block diagram showing an example hardware configuration of the vehicle air conditioner according to the first embodiment of the present invention.

As shown in FIG. 3, the controller 40 is a so-called computer system and is formed by being provided with, for example, a CPU (Central Processing Unit) 1, a main storage device 2 such as a RAM (Random Access Memory), etc., an auxiliary storage device 3 such as a ROM (Read Only Memory), an HDD (Hard Disk Drive), etc., and a communication unit 4 that performs communication with external devices and the like. Various programs (vehicle air conditioning programs) are stored in the auxiliary storage device 3, and the CPU 1 reads out the programs from the auxiliary storage device 3 to the main storage device 2 such as the RAM, etc. to execute them, thereby realizing various processing.

The controller 40 is electrically connected to the outdoor-air temperature sensor 41, the cabin-temperature sensor 42, and the solar radiation sensor 43 shown in FIG. 1 and receives detected values input from the respective sensors. In addition, the controller 40 is also connected to various switches (not shown) with which occupants perform various settings such as the temperature setting, operation mode, etc. Then, upon receiving detected values and control instructions for the settings, the controller 40 executes operation control of the air conditioner on the basis of control programs assigned in advance. Specific operation control includes turning the air conditioning operation on/off, air flow control of the blower 12, open/close control of various dampers, and so on.

Figure 4:
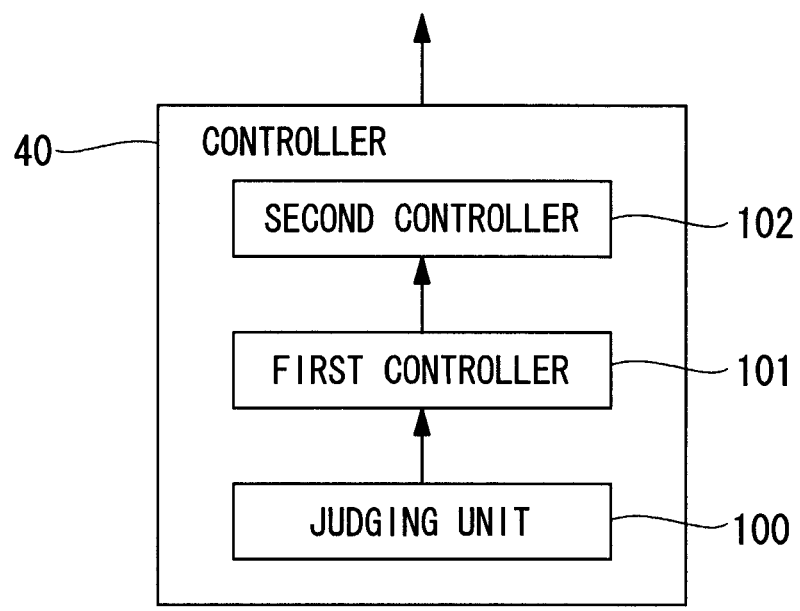
FIG. 4 is a functional block diagram of a controller according to the first embodiment of the present invention.

FIG. 4 is a function block diagram showing, in expanded fashion, the functions realized by the controller 40. As shown in FIG. 4, the controller 40 is provided with a judging unit 100, a first controller 101, and a second controller 102 and performs air conditioning control in accordance with solar radiation information, which is information about the solar radiation level, the angle of the sunlight, etc. of each air-conditioned zone measured by the solar radiation sensor.

The solar radiation sensor 43 measures solar radiation levels individually for the first air-conditioned zone and the second air-conditioned zone, which are adjacent to each other. This embodiment employs a solar radiation sensor which has a first measuring unit on the drive-seat side for measuring the solar radiation level of the first air-conditioned zone 201 and a second measuring unit on the passenger-seat side for measuring the solar radiation level of the second air-conditioned zone 202, which are built into a single housing.

As shown in FIG. 2, the solar radiation sensor 43 is disposed for example, in the vehicle cabin at a substantially center position at the inner side of a front windshield. The disposition position may be at the center of the front windshield, slightly skewed toward the driver-seat side or slightly skewed toward the passenger-seat side. In addition, although the sensor is disposed at the front of the vehicle, it may be disposed at the back thereof.

In the controller 40, the judging unit 100 judges whether or not a difference between the solar radiation level in the first air-conditioned zone and the solar radiation level in the second air-conditioned zone falls within a predetermined range. Specifically, a difference between the solar radiation level measured by the first measuring unit on the driver-seat side and the solar radiation level measured by the second measuring unit on the passenger-seat side is computed, and it is judged whether or not the difference falls within the predetermined range. As a result of this, if the difference falls within the predetermined range, for example, if the absolute value of the difference is between 0 and 100 mW/m$^2$, it is judged that the perceptions in the first air-conditioned zone and the second air-conditioned zone are the same.

When the judging unit 100 judges that the difference falls within the predetermined range, the first controller 101 performs identical air conditioning control for the first air-conditioned zone and the second air-conditioned zone. Specifically, of the first air-conditioned zone and the second air-conditioned zone, the air-conditioned zone with a greater solar radiation level is selected as a first reference zone, and the air conditioning control of the first air-conditioned zone and the second air-conditioned zone is performed on the basis of the solar radiation level of the selected first reference zone.

For example, when the solar radiation level on the driver-seat side is greater than the solar radiation level on the passenger-seat side, the first controller 101 selects the driver-seat-side air-conditioned zone as the first reference zone, computes a control value for the driver-seat side on the basis of the solar radiation level of the driver-seat side, and performs identical air conditioning control for the driver-seat side and the passenger-seat side on the basis of this control value.

When the judging unit 100 judges that the difference falls outside the predetermined range, the second controller 102 performs independent air conditioning control individually for the first air-conditioned zone and the second air-conditioned zone.

Specifically, of the first air-conditioned zone and the second air-conditioned zone, the second controller 102 selects one air-conditioned zone as a second reference zone and defines the solar radiation level of the second reference zone as a standard solar radiation level. A control value for air conditioning control of the second reference zone is determined on the basis of this standard solar radiation level. Subsequently, a control value for the other air-conditioned zone is computed by correcting the control value for the second reference zone on the basis of the difference between the standard solar radiation level and the solar radiation level of the other air-conditioned zone.

For example, when it is registered in advance that the driver-seat side will be selected as the second reference zone, the second controller 102 selects the driver-seat-side air-conditioned zone as the second reference zone. Then, the solar radiation level on the driver-seat side is defined as the standard solar radiation level, and a control value for the driver-seat side is determined on the basis of the standard solar radiation level. Subsequently, a control value for the passenger-seat side is computed by correcting the control value for the driver-seat side on the basis of the difference between the solar radiation level for the driver-seat side and the solar radiation level for the passenger-seat side.

In this way, because the control value of the other air-conditioned zone is determined by correcting the air conditioning control value for the second reference zone on the basis of the difference between the solar radiation level of the second reference zone and the solar radiation level of the other air-conditioned zone, air conditioning control of a plurality of air-conditioned zones can be easily performed.

Figure 5:
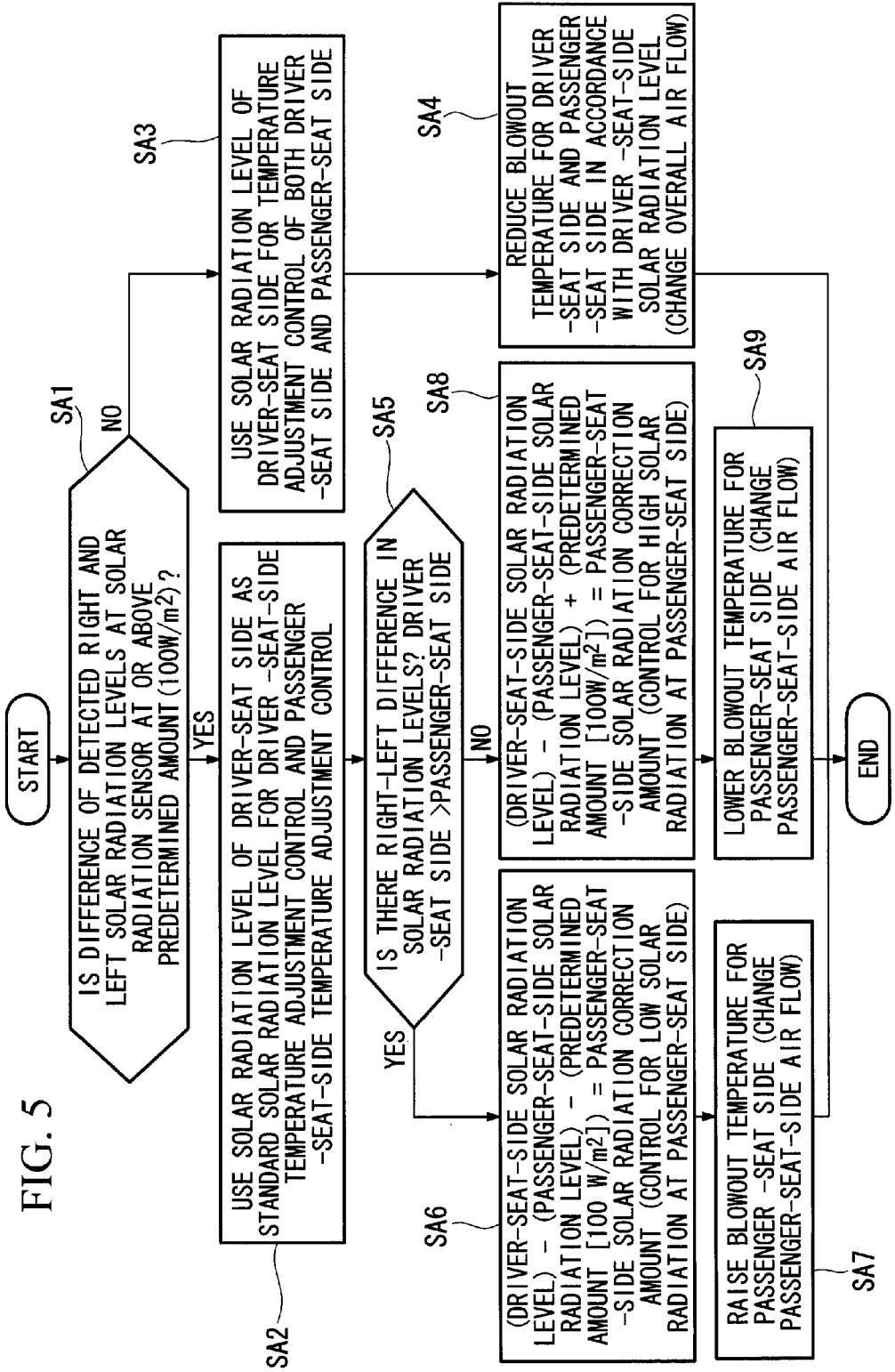
FIG. 5 is a diagram showing an operation flow of a judging unit according to the first embodiment of the present invention.

FIG. 5 is a diagram showing the operation flow of the air conditioning control performed by the controller 40 described above. The following flow will be described assuming the case in which the driver-seat-side air-conditioned zone is selected as the second reference zone.

The solar radiation sensor 43 measures respective solar radiation levels of the driver-seat side and the passenger-seat side, and the judging unit 100 computes the difference between the solar radiation levels of the driver-seat side and the passenger-seat side and judges whether or not the difference exceeds a first predetermined value (Step SA1 in FIG. 5). If the first predetermined value is not exceeded, the first controller 101 compares the solar radiation level of the driver-seat side and the solar radiation level of the passenger-seat side and selects the air-conditioned zone with a larger value as the first reference zone (Step SA3). Then, the air conditioning value is computed on the basis of the solar radiation level of the first reference zone, and air conditioning control based on this air conditioning control value is performed for the driver-seat side and the passenger-seat side (Step SA4), whereupon this processing ends.

On the other hand, if the difference between the solar radiation levels of the driver-seat side and the passenger-seat side exceeds the first predetermined value, the judging unit 100 selects the driver-seat-side air-conditioned zone as the second reference zone and, in addition, the solar radiation level for this air-conditioned zone is set as a reference solar radiation level. Then, the control value for the second reference zone is determined on the basis of the solar radiation level of the second reference zone, that is, the solar radiation level of the driver-seat side (Step SA2). Subsequently, magnitudes of the solar radiation levels are compared between the driver-seat side and the passenger-seat side (Step SA5), and if the solar radiation level of the driver-seat side is greater than the solar radiation level of the passenger-seat side, the calculation "driver-seat-side solar radiation level−passenger-seat-side solar radiation level−second predetermined value" is performed, thereby computing the correction amount for the passenger-seat side. Here, the second predetermined value is a parameter provided to adjust the control value for the driver-seat side and the control value for the passenger-seat side and is an arbitrarily set value. In this embodiment, for example, it is set at 100 W/m$^2$. Subsequently, the control value for the passenger-seat side is computed by adding this correction amount to the above-described control value for the driver-seat side (Step SA6), and the air conditioning control for the passenger-seat side is performed on the basis of this control value (Step SA7), whereupon this processing ends. As a result of this, for example, the blowout temperature for the passenger-seat side is raised, thereby suppressing the cooling effect for the passenger-seat side.

Furthermore, in Step SA5, if the solar radiation level for the driver-seat side is less than the solar radiation level for the passenger-seat side, the calculation "driver-seat-side solar radiation level−passenger-seat-side solar radiation level+ third predetermined value" is performed, thereby computing the correction amount for the passenger-seat side. Here, the third predetermined value is a parameter provided to adjust the control value for the driver-seat side and the control value for the passenger-seat side and is an arbitrarily set value. In this embodiment, for example, it is set at 100 W/m$^2$. Subsequently, the control value for the passenger-seat side is computed by adding this correction amount to the above-described control value for the driver-seat side (Step SA8), and the air conditioning control for the passenger-seat side is performed on the basis of this control value (Step SA9), whereupon this processing ends. As a result of this, for example, the blowout temperature for the passenger-seat side is lowered, thereby increasing the cooling effect for the passenger-seat side.

In the above description, the case in which the driver-seat side is set as the second reference zone has been described; however, the passenger-seat side may be set as the second reference zone. In this case, the control value for the passenger-seat side is determined on the basis of the solar radiation level of the passenger-seat side, and the control value for the passenger-seat side is corrected in accordance with the difference between the solar radiation level of the passenger-seat side and the solar radiation level of the driver-seat side, thereby determining the control value for the driver-seat side.

In addition, in the above-described flow, the first predetermined value, the second predetermined value, and the third predetermined value may be changed depending on the outdoor temperature (season) and blowout mode. Furthermore, the second predetermined value and the third predetermined value need not be the same value as the above-described first predetermined value. Accordingly, finer air conditioning control becomes possible.

As has been described above, in the air conditioning control according to this embodiment, of the air-conditioned zones splitting the vehicle cabin interior into a plurality of zones, the solar radiation sensor, which measures the solar radiation levels individually for the driver-seat side and the passenger-seat side, which are adjacent air-conditioned zones, is used to judge whether or not the difference in the solar radiation level between the driver-seat side and the passenger-seat side falls within the predetermined range. When the difference falls within the predetermined range, identical air conditioning control is performed for the driver-seat side and the passenger-seat side, thereby making it possible to perform temperature-adjustment control for the driver-seat side and the passenger-seat side, where the perceived solar radiation is nearly equivalent, so as not to cause a temperature difference. In addition, when the difference falls outside the predetermined range, independent air conditioning control is performed individually for the driver-seat side and the passenger-seat side. Accordingly, for the air-conditioned zones where the perceived solar radiation differs, it becomes possible to perform air conditioning appropriate for the individual air-conditioned zones.

Furthermore, with the control by the controller according to this embodiment, because identical air conditioning control is performed for the driver-seat side and the passenger-seat side when the difference in the solar radiation level between the driver-seat side and the passenger-seat side falls within the predetermined range, even when the perceptions on the driver-seat side and the passenger-seat side are the same, gaps in the differences between the blowout temperature and the perception, which has occurred when the blowout temperature is controlled in accordance with uneven solar radiation, can be eliminated.

Furthermore, when judging whether or not the difference in the solar radiation level between the driver-seat side and the passenger-seat side falls within the predetermined range, the judgment is made, allowing some margin, by measuring whether or not the difference falls within a range of predetermined output values. Accordingly, individual differences of the solar radiation sensors can be tolerated.

{Modification 1}

Although the second controller 102 in this embodiment sets the correction amount for the passenger-seat side on the basis of the solar radiation level of the driver-seat side, which is the air-conditioned zone with a higher solar radiation level, it is not limited thereto. For example, when the relevant difference is at or above the predetermined value, independent solar radiation correction may be executed individually for the driver-seat side and the passenger-seat side on the basis of respective input values for the driver-seat side and the passenger-seat side from the solar radiation sensor.

In the vehicle air conditioner according to this embodiment, when measuring the solar radiation levels of the individual air-conditioned zones, a single solar radiation sensor is provided with the first measuring unit and the second measuring unit that measure the solar radiation levels of the individual air-conditioned zones; however, it is not limited thereto. For example, solar radiation sensors that measure the solar radiation level of each air-conditioned zone may be provided for the individual air-conditioned zones.

In the vehicle air conditioner according to this embodiment, when measuring the solar radiation levels of the individual air-conditioned zones, a single solar radiation sensor is provided with the first measuring unit and the second measuring unit that measure the solar radiation levels of the individual air-conditioned zones; however, it is not limited thereto. For example, solar radiation sensors that measure the solar radiation level of each air-conditioned zone may be provided for the individual air-conditioned zones.

In addition, although, in the air conditioning control according to this embodiment, it is registered in advance that the driver-seat side will be selected as the second reference zone, it is not limited thereto. For example, an air-conditioned zone with a higher solar radiation level may be selected as the second reference zone.

Furthermore, although the air conditioning control according to this embodiment has been applied to cooling as the operating mode, it is not limited thereto. For example, it may be applied to heating.

Second Embodiment

Next, air conditioning control according to a second embodiment of the present invention will be described.

This embodiment differs from the above-described first embodiment in that the solar radiation sensor outputs the incident angle of the sunlight as an output and that the judging unit makes judgment on the basis of the incident angle of the sunlight.

Specifically, in this embodiment, the solar radiation sensor is provided near the border between the first air-conditioned zone and the second air-conditioned zone, which are adjacent to each other, and outputs the incident angle of the sunlight upon itself. When the incident angle of the sunlight, which is the output from the solar radiation sensor, falls within a predetermined range, with zero degree defined with reference to itself, for example, within a range between $-\alpha$ and $+\alpha$ (for example, from $-45°$ to $+45°$ centered on itself), the judging unit considers the perceived temperature as nearly equal in the first air-conditioned zone and the second air-conditioned zone, and when the incident angle does not fall within the range between $-\alpha$ and $+\alpha$ (for example, from $-45°$ to $+45°$ centered on itself), it is considered that a difference occurs in the perceived temperature between the first air-conditioned zone and the second air-conditioned zone.

When the incident angle falls within the predetermined range, the first controller performs the same air conditioning control for the first air-conditioned zone and the second air-conditioned zone, and when the incident angle of the sunlight falls outside the predetermined range, the second controller performs independent air conditioning control individually for the first air-conditioned zone and the second air-conditioned zone. The details of the air conditioning control by the first controller and the second controller are the same as those of the first embodiment described above.

In this way, with the vehicle air conditioner 50 according to this embodiment, because the angle of the sunlight input to the solar radiation sensor is used to judge whether or not the direction of solar radiation is near the boundary, consequently, it becomes possible to easily judge the direction of the solar radiation.

REFERENCE SIGNS LIST

10: air conditioning unit (HVAC)
12: blower
13: evaporator
14: heater core
15: partition plate
24: driver-seat-side flow path
25: passenger-seat-side flow path
31: internal-external air exchange damper
32, 33: air mixing damper
40: controller
43: solar radiation sensor
50: vehicle air conditioner
100: judging unit
101: first controller
102: second controller
201: first air-conditioned zone
202: second air-conditioned zone

The invention claimed is:

1. A vehicle air conditioner for a vehicle cabin interior split into a plurality of air-conditioned zones that is capable of independent air conditioning control for individual air-conditioned zones, comprising:
a solar radiation sensor that measures solar radiation levels individually for a first air-conditioned zone and a second air-conditioned zone, which are adjacent to each other;
a judging unit that judges whether or not a difference between the solar radiation level of the first air-conditioned zone and the solar radiation level of the second air-conditioned zone falls within a predetermined range;
a first controller that performs identical air conditioning control for the first air-conditioned zone and the second air-conditioned zone when the difference falls within the predetermined range; and
a second controller that performs independent air conditioning control individually for the first air-conditioned zone and the second air-conditioned zone when the difference falls outside the predetermined range,
wherein, of the first air-conditioned zone and the second air-conditioned zone, the first controller selects the air-conditioned zone with a higher solar radiation level as a first reference zone and performs the air conditioning control of the first air-conditioned zone and the second air-conditioned zone on the basis of the solar radiation level of the first reference zone, and
wherein, of the first air-conditioned zone and the second air-conditioned zone, the second controller selects one zone as a second reference zone, corrects a control value for the second reference zone on the basis of a difference between a solar radiation level of the second reference zone and a solar radiation level of the other air-conditioned zone, and computes and adjusts a control value for the other air-conditioned zone.

2. A vehicle air conditioner according to claim 1, wherein the second controller selects the air-conditioned zone with a higher solar radiation level as the second reference zone.

3. A vehicle air conditioner according to claim 1, wherein, of the first air-conditioned zone and the second air-conditioned zone, the second controller selects one zone as a second reference zone and performs the air conditioning control for the other air-conditioned zone on the basis of the solar radiation level of the second reference zone.

4. A vehicle air conditioner according to claim 3, wherein the second controller selects the air-conditioned zone with a higher solar radiation level as the second reference zone.

5. A control method for a vehicle air conditioner for a vehicle cabin interior split into a plurality of air-conditioned zones, that is capable of independent air conditioning control for individual air-conditioned zones, using a controller comprising:
a step of measuring solar radiation levels individually for a first air-conditioned zone and a second air-conditioned zone, which are adjacent to each other, and judging whether or not a difference between the solar radiation level of the first air-conditioned zone and the solar radiation level of the second air-conditioned zone falls within a predetermined range;

a first controlling step of performing identical air conditioning control for the first air-conditioned zone and the second air-conditioned zone when the difference falls within the predetermined range; and a second controlling step of performing independent air conditioning control individually for the first air-conditioned zone and the second air-conditioned zone when the difference falls outside the predetermined range, wherein, of the first air-conditioned zone and the second air-conditioned zone, the air-conditioned zone with a higher solar radiation level is selected by the first controlling step as a first reference zone, and the air conditioning control of the first air-conditioned zone and the second air-conditioned zone is performed on the basis of the solar radiation level of the first reference zone, and wherein, of the first air-conditioned zone and the second air-conditioned zone, one zone is selected as a second reference zone, a control value for the second reference zone on the basis of a difference between a solar radiation level of the second reference zone and a solar radiation level of the other air-conditioned zone is corrected, and a control value for the other air-conditioned zone is computed and adjusted by the second controlling step.

6. A vehicle air conditioner program that is a control program applied to a vehicle air conditioner for a vehicle cabin interior split into a plurality of air-conditioned zones, which is capable of independent air conditioning control for individual air-conditioned zones, and that causes a computer to execute:

judgment processing in which solar radiation levels are individually measured for a first air-conditioned zone and a second air-conditioned zone, which are adjacent to each other, and it is judged whether or not a difference between the solar radiation level of the first air-conditioned zone and the solar radiation level of the second air-conditioned zone falls within a predetermined range;

first control processing of performing identical air conditioning control for the first air-conditioned zone and the second air-conditioned zone when the difference falls within the predetermined range; and second control processing of performing independent air conditioning control individually for the first air-conditioned zone and the second air-conditioned zone when the difference falls outside the predetermined range, wherein, of the first air-conditioned zone and the second air-conditioned zone, the air-conditioned zone with a higher solar radiation level is selected by the first control processing as a first reference zone, and the air conditioning control of the first air-conditioned zone and the second air-conditioned zone is performed on the basis of the solar radiation level of the first reference zone, and wherein, of the first air-conditioned zone and the second air-conditioned zone, one zone is selected as a second reference zone, a control value for the second reference zone on the basis of a difference between a solar radiation level of the second reference zone and a solar radiation level of the other air-conditioned zone is corrected, and a control value for the other air-conditioned zone is computed and adjusted by the second control processing.

\* \* \* \* \*